US007724218B2

(12) United States Patent
Kim et al.
(10) Patent No.: US 7,724,218 B2
(45) Date of Patent: May 25, 2010

(54) ORGANIC LIGHT-EMITTING DIODE DISPLAY DEVICE AND DRIVING METHOD THEREOF

(75) Inventors: O Hyun Kim, Pohang-si (KR); Hoon Ju Chung, Pyeongtaek-si (KR); Myoung Hoon Jung, Seoul (KR)

(73) Assignee: LG. Display Co., Ltd., Seoul (KR)

( * ) Notice: Subject to any disclaimer, the term of this patent is extended or adjusted under 35 U.S.C. 154(b) by 839 days.

(21) Appl. No.: 11/634,568

(22) Filed: Dec. 6, 2006

(65) Prior Publication Data

US 2007/0279337 A1 Dec. 6, 2007

(30) Foreign Application Priority Data

Jun. 1, 2006 (KR) ...................... 10-2006-0049435

(51) Int. Cl.
*G09G 3/30* (2006.01)
*G09G 3/32* (2006.01)
*G09G 5/00* (2006.01)
*G06F 3/038* (2006.01)

(52) U.S. Cl. ............................ 345/76; 345/82; 345/204

(58) Field of Classification Search ............ 345/30–111
See application file for complete search history.

(56) References Cited

U.S. PATENT DOCUMENTS

2004/0239654 A1* 12/2004 Okuda ......................... 345/204
2005/0243076 A1* 11/2005 Kim et al. .................. 345/204

* cited by examiner

*Primary Examiner*—Sumati Lefkowitz
*Assistant Examiner*—Charles Hicks
(74) *Attorney, Agent, or Firm*—Brinks Hofer Gilson & Lione

(57) ABSTRACT

An organic light-emitting diode display device and driving method thereof are provided. The organic light-emitting diode display device including a driving voltage source; a reference voltage source that generates a reference voltage; a reference current source; and a storage capacitor connected between a first node and a second node. An organic light-emitting diode device is connected between a third node and a ground voltage source. A first scanning signal is supplied to a first scan line. A second scanning signal is supplied to a second scan line, the second scanning signal having an inverse-phase against the first scanning signal.

26 Claims, 12 Drawing Sheets

ORGANIC LIGHT-EMITTING DIODE DISPLAY DEVICE AND DRIVING METHOD THEREOF

This application claims the benefit of Korean Patent Application No. P06-0049435 filed in Korea on Jun. 01, 2006, which is hereby incorporated by reference.

BACKGROUND

1. Field

The present embodiments relate to an organic light-emitting diode display device and a driving method thereof.

2. Related Art

Recently, various flat panel display devices have been developed. These flat panel display devices have a reduced weight and bulk and are capable of eliminating disadvantages of a cathode ray tube. Such flat panel display devices include, for example, a liquid crystal display device (hereinafter, referred to as "LCD"), a field emission display device (hereinafter, referred to as "FED"), a plasma display panel (hereinafter, referred to as "PDP") and an electro-luminescence display device.

In such flat panel display devices, the PDP has a light weight, a small bulk size and a large dimension screen because its structure and manufacturing process are simple. However, the PDP has low light-emission efficiency and large power consumption.

The active matrix LCD employing a thin film transistor (hereinafter, referred to as "TFT") as a switching device has drawbacks in that it is difficult to increase the dimension screen because a semiconductor process is used. Recently, however, the LCD has an increased demand because it is mainly used for a display device of a notebook personal computer.

The EL device is largely classified into an inorganic EL device and an organic light-emitting diode device depending upon a material of a light-emitting layer, and is a self-luminous device. When compared with the above-mentioned display devices, the EL device has advantages of a fast response speed, large light-emission efficiency, a large brightness and a large viewing angle.

Referring to FIG. 1, the organic light-emitting diode device comprises an anode electrode made from a transparent conductive material on a glass substrate, an organic compound layer disposed on the organic light-emitting diode device, and a cathode electrode made from a conductive metal.

The organic compound layer is comprised of a hole injection layer HIL, a hole transport layer HTL, an emission layer EML, an electron transport layer ETL and an electron injection layer.

If a driving voltage is applied to the anode electrode and the cathode electrode, then a hole within the hole injection layer and an electron within the electron injection layer move toward the emission layer, respectively, to excite the emission layer, so that the emission layer emits visible rays. The visible rays generated from the emission layer display a picture or a motion picture.

The organic light-emitting diode device has been applied to a display device of a passive matrix type or to a display of an active matrix type using a TFT as a switching element. The passive matrix type crosses the anode electrode with the cathode electrode to select a light-emitting cell in accordance with a current applied to the electrodes while the active matrix type selectively turns on an active element, for example, a TFT to select a light-emitting cell and maintains a light-emitting of the light-emitting cell using a voltage maintained at a storage capacitor.

FIG. 2 is a circuit diagram equivalently showing one pixel in an organic light-emitting diode display device of an active matrix type.

Referring to FIG. 2, the organic light-emitting diode display device of the active matrix type includes an organic light-emitting diode element OLED, a data line DL and a gate line GL that cross with each other, a switch TFT T2, a driving TFT T1 and a storage capacitor Cst. The driving TFT T1 and the switch TFT T2 are implemented in a p-type MOS-FET.

The switch TFT T2 is turned-on in response to a gate low-level voltage (or a scanning voltage) from the gate line GL to be electrically connected a current path between a source electrode and a drain electrode of the switch TFT T2. The switch TFT T2 maintains an off-state when a voltage on the gate line GL is less than a threshold voltage (hereinafter, referred to as "Vth") of the switch TFT T2, for example, a gate high-level voltage.

A data voltage from the data line DL is applied, via the source electrode and the drain electrode of the switch TFT T2, a gate electrode and a storage capacitor Cst of the driving TFT T1 during an on-time period of the switch TFT T2. Alternatively, a current path between the source electrode and the drain electrode of the switch TFT T2 is opened during an off-time period of the switch TFT T2 to not apply the data voltage VDL to the driving TFT T1 and the storage capacitor Cst.

The source electrode of the driving TFT T1 is connected to a driving voltage line VL and one end of the storage capacitor Cst. The drain electrode of the driving TFT T1 is connected to the anode electrode of the organic light-emitting diode display OLED. The gate electrode of the driving TFT T1 is connected to the drain electrode of the switch TFT T2. Such a driving TFT T1 adjusts a current amount between the source electrode and the drain electrode in accordance with a gate voltage supplied to the gate electrode, for example, a data voltage to have the organic light-emitting diode display OLED to be emitted at brightness corresponding to the data voltage.

The storage capacitor Cst stores a difference voltage between the data voltage and a high-level electric potential driving voltage VDD, which constantly maintains a voltage applied to the gate electrode of the driving TFT T1 during one frame period.

The organic light-emitting diode display OLED is implemented in the structure as shown in FIG. 1 and includes a cathode electrode connected to the drain electrode of the driving TFT T1 and a cathode electrode supplied with a ground voltage source GND. The organic light-emitting diode display OLED is emitted by a current between a source-drain of the driving TFT T1 defined in accordance with the gate voltage of the driving TFT T1.

The organic light-emitting diode display device as shown in FIG. 2 determines a current flowing into the organic light-emitting diode display OLED in accordance with a characteristics of the driving TFT T1. Accordingly, if the characteristics of the driving TFT T1 are uniform for each pixel, then a picture is displayed with constant brightness characteristics. The characteristics of the driving TFT T1, for example, a threshold voltage characteristic is different at each position in a screen of the manufactured panel. Because a high-level potential driving voltage VDD is dropped by the driving voltage line VL, brightness at each position in the screen even through the same data are supplied to the screen.

FIG. 3 shows a vertical strip phenomenon of a screen generated at the same gray scale data by a voltage drop defined by a threshold voltage deviation of the driving TFT T1 and the driving voltage line VL at the organic light-emitting diode display device of the active matrix type.

For example, as shown in FIG. 4, because a power of laser is instabilized in accordance with in length of time when an amorphous silicon a-Si formed on a TFT substrate of the organic light-emitting diode display device is crystallized in a poly silicon p-Si at a laser crystallization process, the semiconductor characteristics of the TFT substrate are uninform. Because a membranous of a silicon thin film generated at a border between portions irradiated at different time, the scanning and the laser irradiation are performed for the surface of the substrate at a regular interval, the semiconductor characteristics of the TFT substrate are uniform. When the semiconductor characteristics of the TFT substrate generates a deviation depending upon a position, a stripe phenomenon is generated as shown in FIG. 3 and brightness is not uniformly generated at the same gray scale data.

SUMMARY

The present embodiments may obviate one or more of the limitations of the related art. For example, in one embodiment, an organic light-emitting diode display device is adaptive to minimize a voltage drop by a driving voltage supply line and an adverse effect by a threshold voltage change of a thin film transistor to uniform display brightness.

In a first embodiment, the organic light-emitting diode display device includes a driving voltage source generating a driving voltage. A reference voltage source generates a reference voltage. A reference current source generates a reference current. A storage capacitor is connected between a first node and a second node. An organic light-emitting diode device is connected between a third node and a ground voltage source. A first scanning signal is supplied to a first scan line. A second scanning signal is supplied to a second scan line. The second scanning signal has an inverse-phase against the first scanning signal. A data line crosses the first and second scan lines, and to which a data voltage is supplied.

A first switch element maintains an off-state during a first period, and then supplies the reference voltage to the first node in response to the first scanning signal, during a second period. A second switch element supplies the data voltage to the first node in response to the second scanning signal, during the first period, and then maintaining an off-state during the second period. A third switch element adjusts a current which is supplied to the organic light-emitting diode device in accordance with a voltage of the second node. A fourth switch element supplies the reference current to the second node in response to the second scanning signal, during the first period, and then maintains an off-state, during the second period. A fifth switch element forms a current path between the second node and the third node in response to the second scanning signal, during the first period, and then maintains an off-state, during the second period. A sixth switch element cuts-off a current flowing into the organic light-emitting diode device via the third node, during the first period, and then forms a current path between the third node and the organic light-emitting diode device in response to any one of the first scanning signal and a voltage of the second node.

An organic light-emitting diode display device according to a second embodiment includes a driving voltage source that generates a driving voltage. A reference voltage source generates a reference voltage. A reference current source generates a reference current. A storage capacitor connected between a first node and a second node. An organic light-emitting diode device is connected between a third node and a ground voltage source. A scanning signal is supplied to a scan line. A data voltage is supplied to a data line that crosses the first and second scan lines.

A first switch element maintains an off-state in response to a first voltage of the scanning signal, during a first period, and then supplies the reference voltage to the first node in response to a second voltage of the scanning signal, during a second period. A second switch element supplies the data voltage to the first node in response to a first voltage of the scanning signal, during the first period, and then maintains an off-state, during the second period. A third switch element adjusts a current which is supplied to the organic light-emitting diode device in accordance with a voltage of the second node. A fourth switch element supplies the reference current to the second node in response to a first voltage of the scanning signal, during the first period, and then maintains an off-state, during the second period. A fifth switch element forms a current path between the second node and the third node in response to a first voltage of the scanning signal, during the first period, and then maintains an off-state, during the second period. A sixth switch element cuts-off a current flowing into the organic light-emitting diode device via the third node, during the first period, and then forms a current path between the third node and the organic light-emitting diode device in response to any one of a voltage of the second node and a second voltage of the scanning signal, during the second period.

A method of driving an organic light-emitting diode display device according to the first embodiment, including a plurality of data lines and data lines that cross with each other, a storage capacitor connected between a first node and a second node and an organic light-emitting diode element connected to a third node and a ground voltage source. The method comprising generating a driving voltage, a reference voltage, and a reference current; supplying a first scanning signal to a first scan line and, at the same time, supplying a second scanning signal having an inverse-phase against the first scanning signal to a second scan line; supplying gate voltages to the data lines; during a first period when the first scanning signal maintains a first logic voltage and the second scanning signal maintains a second logic voltage, turning-off a first switch element to which the reference voltage is supplied and connected to the first node and a sixth switch element connected between the third node and the organic light-emitting diode element, turning-on a second switch element to which the data voltage is supplied and connected to the first node, a fourth switch element to which the reference current is supplied and connected to the second node, and a fifth switch element connected between the second node and the third node, respectively, to charge the data voltage into the first node, connecting the second node to the third node to supply the driving voltage, and operating a third switch connected to the third node as a diode to drive the organic light-emitting diode element into a diode; and during a second period when the first scanning signal maintains a second logic voltage and the second scanning signal maintains a first logic voltage, turning-off the first and sixth switch elements, turning-on the second, the fourth and the fifth switch elements to cut-off the data voltage to be supplied to the first node and the reference current supplied to the second node, and charging the first node and the second node using the reference voltage to allow a current to be flowed into the organic light-emitting diode element via the third and sixth switch elements.

A method of driving an organic light-emitting diode display device according to the second embodiment, including a plurality of data lines and data lines that cross with each other, a storage capacitor connected between a first node and a second node and an organic light-emitting diode element connected to a third node and a ground voltage source. The method including generating a driving voltage, a reference voltage, and a reference current; sequentially supplying scanning signals to the scan lines; supplying data voltages to the data lines; during a first period when the scanning signal maintains an active logic voltage, turning-off a first switch element to which the reference voltage is supplied, and connected to the first node, turning-on a second switch element to which the data voltage is supplied and connected to the first node, a fourth switch element to which the reference current is supplied and connected to the second node, and a fifth switch element connected between the second node and the third node, respectively, to connect the second node to third node thereby charging the data voltage into the first node, and to connect the second node to the third node thereby supplying the driving voltage, operating a third switch element connected to the third node as a forward-vias diode to drive the organic light-emitting diode element, and operating a sixth switch element connected between the third node and the organic light-emitting diode element as a reverse-vias diode; and during a second period when the scanning signal maintains an inactive logic voltage, turning-on the first switch element and turning-off the second, the fourth and the fifth switch elements to cut off the data voltage supplied to the first node and cutting-off the reference current supplied to the second node, and charging the first node and the second node using the reference voltage to flow into the organic light-emitting diode element via the third and sixth switch element.

DETAILED DESCRIPTION

Figure 1:
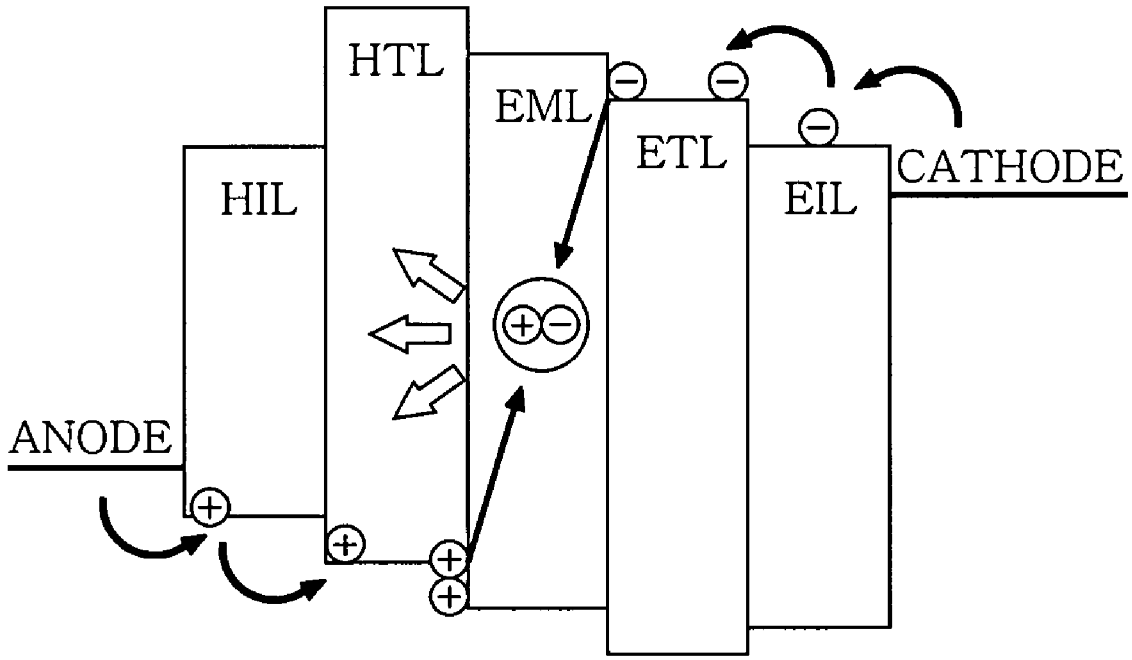
FIG. 1 RELATED ART
FIG. 1 is a diagram schematically showing a structure of a related art organic light-emitting diode display device.
Figure 2:
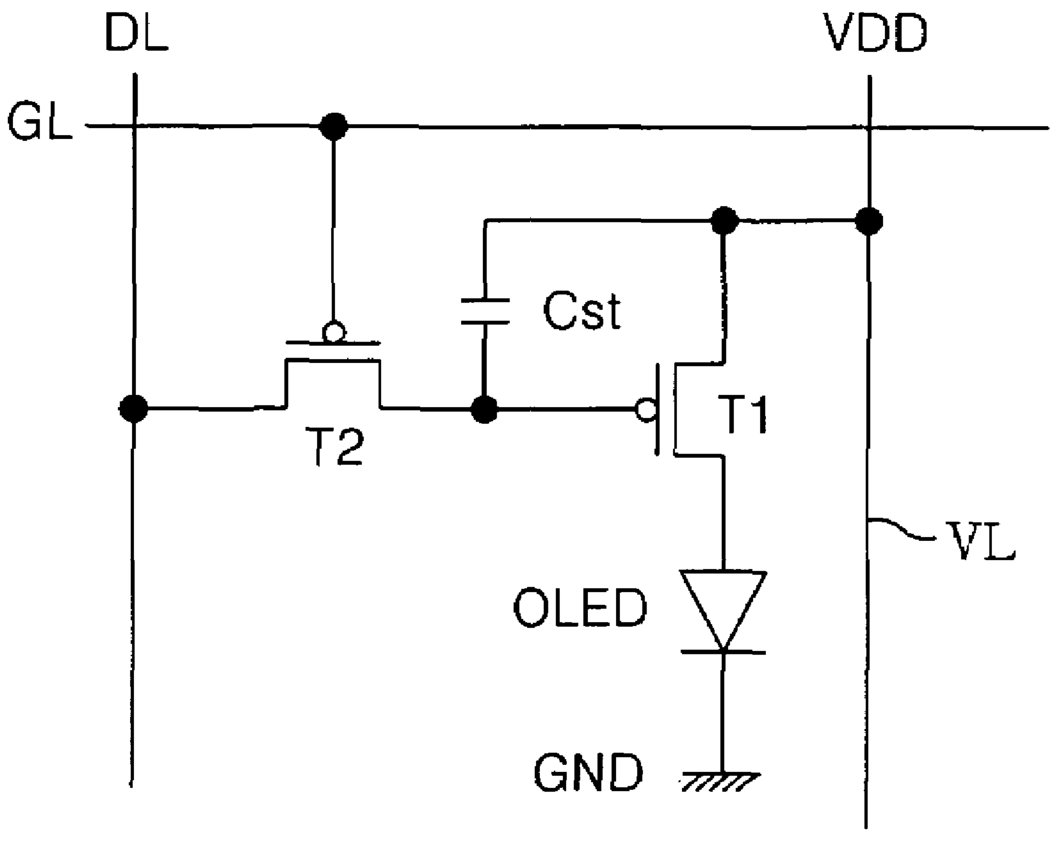
FIG.2 RELATED ART
FIG. 2 is a circuit diagram showing one pixel in an organic light-emitting diode display device of a related art active matrix type.
Figure 3:
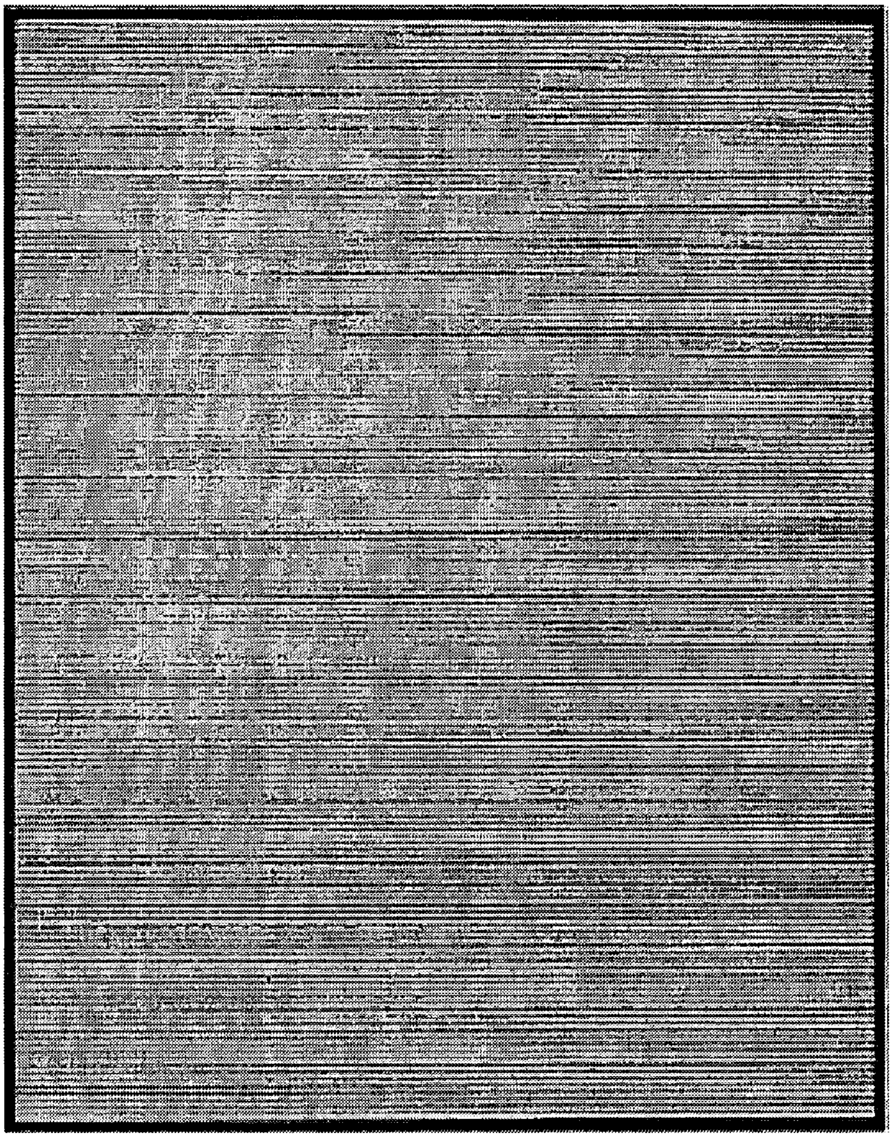
FIG.3 RELATED ART
FIG. 3 is a diagram showing a vertical strip phenomenon of a display picture generated in accordance with a characteristics deviation of a thin film transistor according to the related art.
Figure 4:
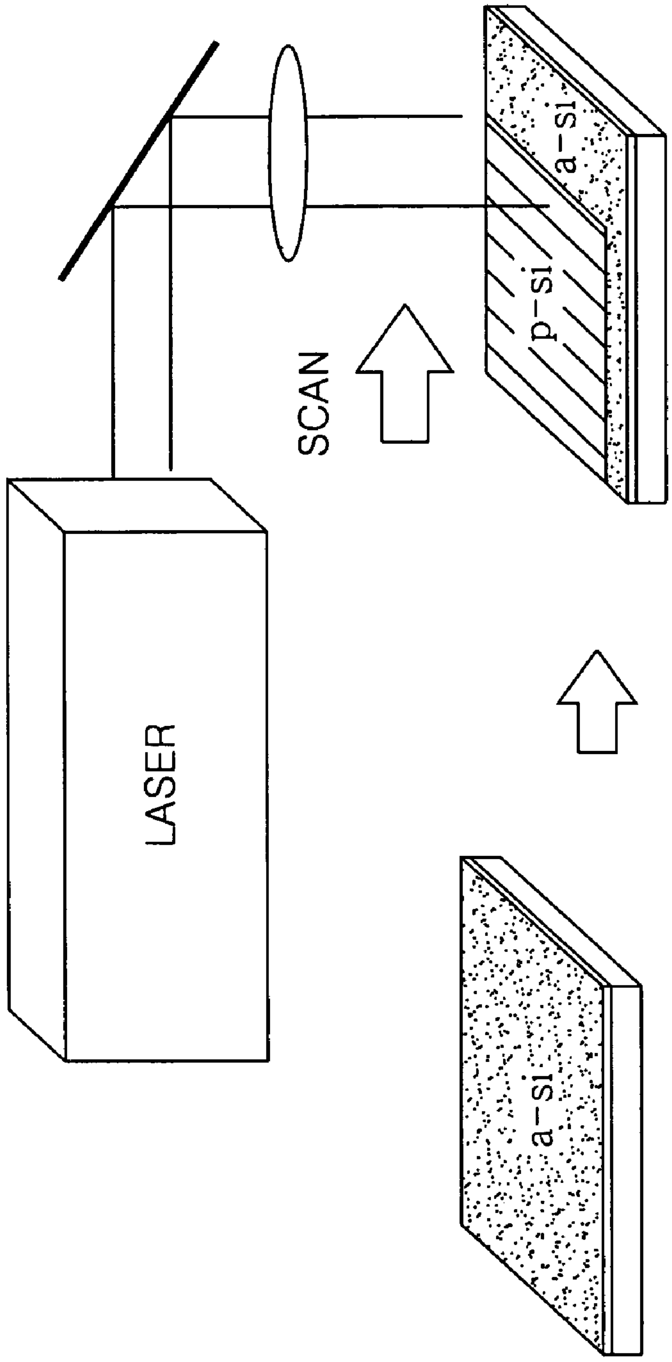
FIG. 4 RELATED ART
FIG. 4 is a diagram schematically showing a laser crystallization process converting an amorphous silicon into a poly silicon according to the related art.

In a first embodiment, as shown in FIG. 5 to FIG. 8, an organic light-emitting diode display device includes a display panel 50 provided m×n pixels 54, a data driver 52 supplying a data voltage to data lines DL1 to DLm, a scan driver 53 sequentially supplying an inverse-phase scanning pulse pair to m scan electrode pairs (E1 to En and S1 to Sn) and a timing controller 51 controlling the drivers 52 and 53.

In the display panel 50, pixels 54 are formed at pixel areas defined by an intersection of n first and second scan lines (E1 to En and S1 to Sn) and m data lines DL1 to DLm. Signal lines supplying a reference voltage Vref of a constant-voltage, a reference current Iref of a constant-current and a high-level electric potential driving voltage VDD to the pixels 54 are formed at the display panel 50.

The data driver 52 converts a digital video data RGB from the timing controller 51 into an analog gamma compensation voltage. The data driver 52 supplies an analog gamma compensation voltage as a data voltage Vdata to the data lines DL1 to DLm in response to a control signal DDC from the timing controller 51 during the aligned programming period PP before an organic light-emitting diode element OLED of each pixel 54.

The scan driver 53 sequentially supplies first scanning pulses EM1 to EMn of a high-level voltage in response to a control signal SDC from the timing controller 51 to the first scan lines E1 to En and generates second scanning pulses SCAN1 to SCANn in an inverse-phase against the first scanning pulses EM1 to EMn at the same time, and sequentially supplies the second scanning pulses SCAN1 to SCANn in such a manner to be synchronized with the first scanning pulses EM1 to EMn to the second scan lines S1 to Sn.

The timing controller 51 supplies a digital video data RGB to the data driver 52 and generates a control signal DDC and GDC controlling an operation timing of the scan driver 53 and the data driver 52 using, for example, a vertical/horizontal synchronizing signal and a clock signal.

A constant-voltage source supplies the reference voltage Vref and a high-level electric potential driving voltage VDD. A constant-current source supplies the reference current Iref to the display panel 50.

Figure 7:
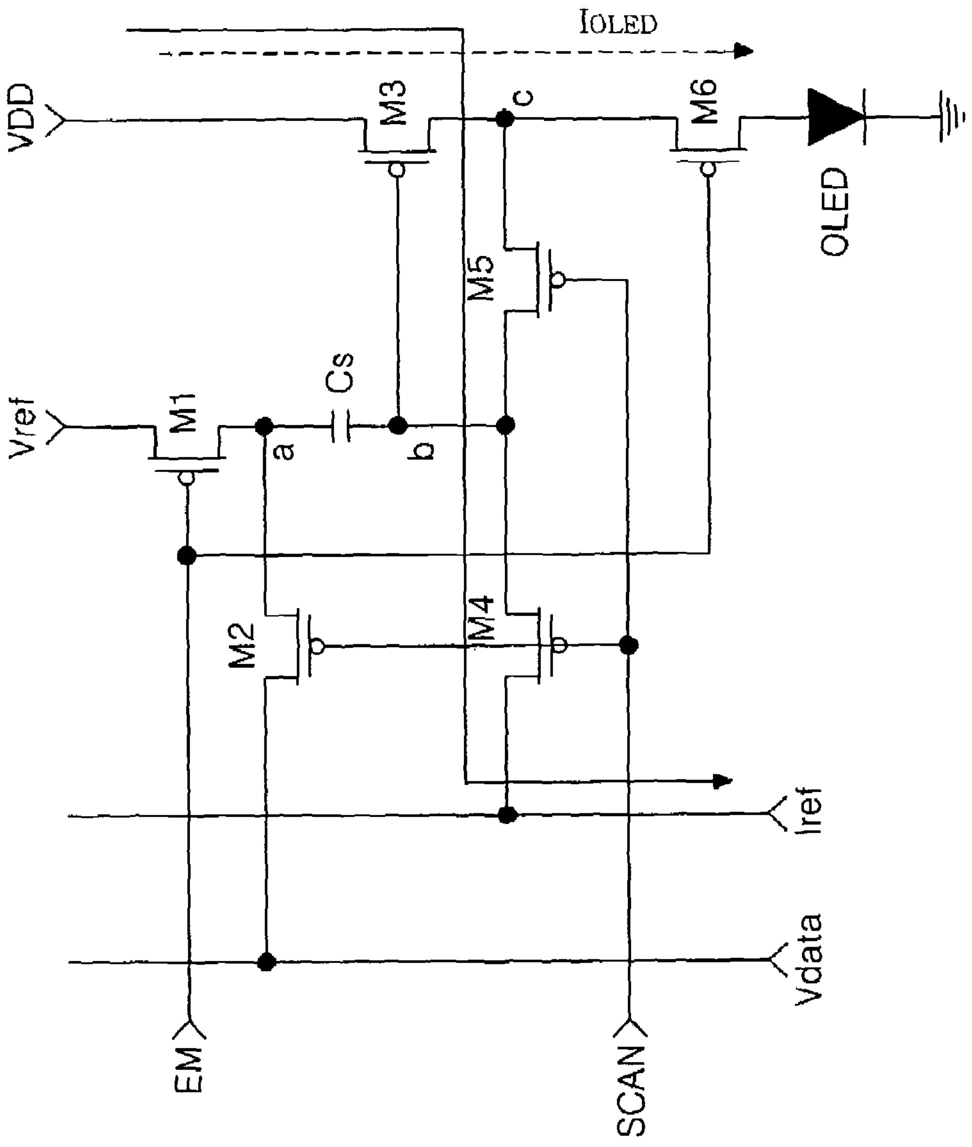
FIG. 7 is a circuit diagram showing a pixel according to FIG. 5.
Figure 8:
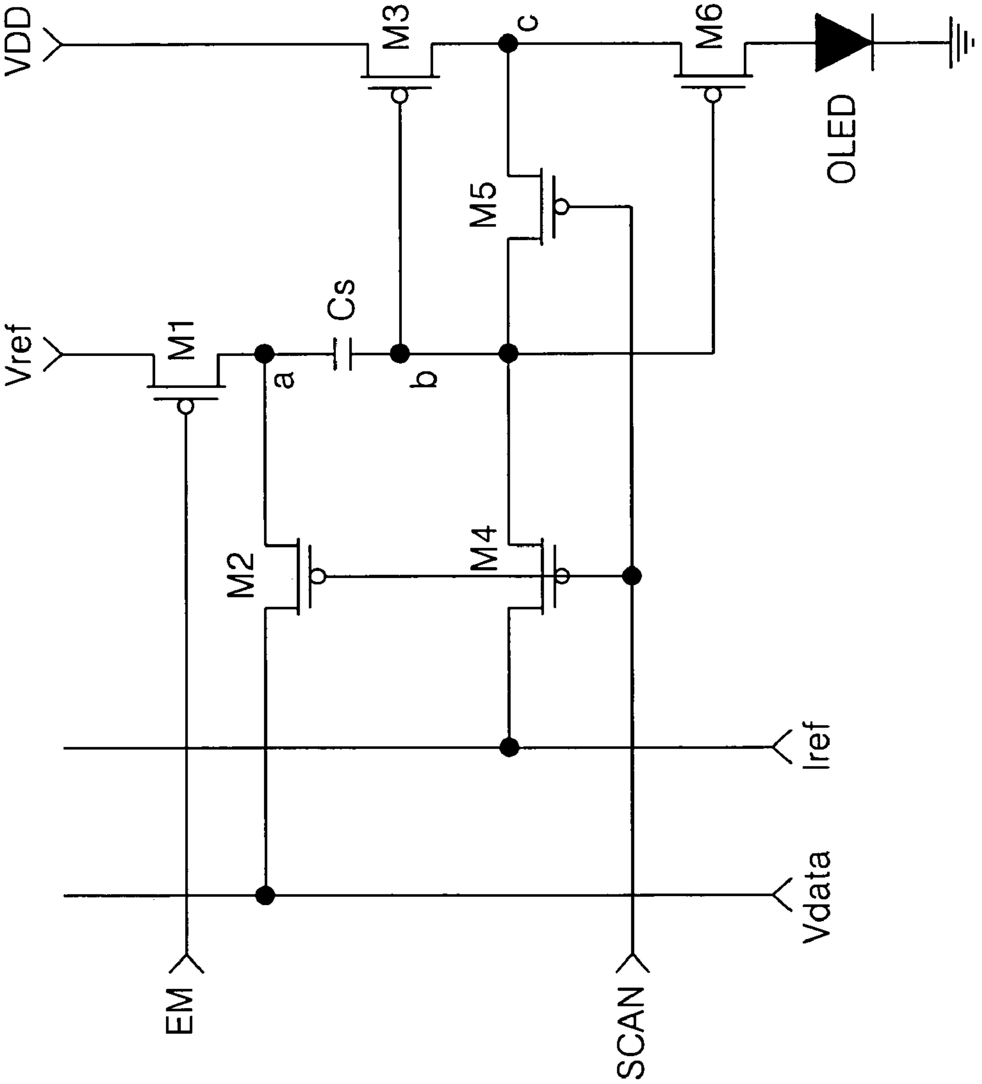
FIG. 8 is a circuit diagram showing a pixel according to FIG. 5.

In one embodiment, as shown in FIG. 7 and FIG. 8, each of the pixels 54 includes the organic light-emitting diode element OLED, six TFTs and one storage capacitor.

FIG. 7 shows a first embodiment of the pixels 54 at the organic light-emitting diode display device.

In one embodiment, as shown in FIG. 7, the first TFT M1 is maintained at an off-state by the first scanning pulses EM1 to EMn supplied from the first scan lines E1 to En during the programming period PP while forms a current path between the reference voltage source Vref and an a-node during a light-emitting period EP. A gate electrode of the first TFT M1 is connected to the first scan lines E1 to En, and a source electrode of the first TFT M1 is connected to the reference voltage source Vref. A drain electrode of the first TFT M1 is connected to the a-node.

The second TFT M2 is turned-on by the second scanning pulses SCAN1 to SCANn supplied from the second scan lines S1 to Sn to connect a current path between the data line DL1 to DLm and the a-node and to be charged the data voltage Vdata into the storage capacitor Cs during the programming period PP while cuts-off a current path between the data line DL1 to DLm and the a-node during the light-emitting period EP. A gate electrode of the second TFT M2 is connected to the second scan lines S1 to Sn, and a source electrode of the second TFT M2 is connected to the data line DL1 to DLm. A drain electrode of the second TFT M2 is connected to the a-node.

The third TFT M3 is a driving TFT and turned-on in response to a gate voltage, for example, a b-node voltage to connect a current path between a high-level electric potential driving voltage VDD and a c-node during the programming period PP and the light-emitting period EP. A gate electrode of the third TFT M3 is connected to the b-node, and a source electrode of-the third TFT M3 is connected to a high-level electric potential driving voltage VDD. A drain electrode of the third TFT M3 is connected to the c-node.

The fourth TFT M4 is turned-on by the second scanning pulses SCAN1 to SCANn supplied from the second scan lines S1 to Sn to connect a current path between the b-node and the constant-current source Iref during the programming period PP while cuts-off a current path between the b-node and the constant-current source Iref during the light-emitting period EP. A gate electrode of the fourth TFT M4 is connected to the second scan lines S1 to Sn, and a source electrode of the fourth TFT M4 is connected to the b-node. A drain electrode of the fourth TFT M4 is connected to the constant-current source Iref.

The fifth TFT M5, similar to the fourth TFT M4, is turned-on by the second scanning pulses SCAN1 to SCANn supplied from the second scan lines S1 to Sn to connect a current path between the b-node and the c-node during the programming period PP while cuts-off a current path between the b-node and the c-node during the light-emitting period EP. A gate electrode of the fifth TFT M5 is connected to the second scan lines S1 to Sn, and a source electrode of the fifth TFT M5 is connected to the c-node. A drain electrode of the fourth TFT M4 is connected to the b-node.

The sixth TFT M6 is maintained at an off-state by the first scanning pulses EM1 to EMn supplied from the first scan lines E1 to En during the programming period PP while forms a current path between the c-node and the organic light-emitting diode element OLED during the light-emitting period EP. A gate electrode of the sixth TFT M6 is connected to the first scan lines E1 to En, and a source electrode of the sixth TFT M6 is connected to the c-node. A drain electrode of the sixth TFT M6 is connected to an anode electrode of the organic light-emitting diode element OLED.

The storage capacitor Cs charges a threshold voltages component and a high-level electric potential driving voltage VDD during the programming period PP, and maintains the charged voltage during the light-emitting period EP.

The organic light-emitting diode element OLED has the same structure as FIG. 1, and is emitted by a current IOLED flowing via the third TFT M3 and the sixth TFT M6 as shown in a dotted line of FIG. 7 during the light-emitting period EP.

The first TFT M1 charges a reference voltage Vref into one electrode of the storage capacitor Cs, and charges a driving voltage which information of has a threshold voltage of the third TFT M3 and a high-level electric potential driving voltage VDD information into the other electrode of the storage capacitor Cs and a gate electrode of the third TFT M3 using the reference voltage Vref during the programming period PP.

The second, the fourth and the fifth TFT M2, M4 and MS charges a data voltage Vdata into one electrode of the storage capacitor Cs, and charges a threshold voltage of the third TFT M3 into the other electrode of the storage capacitor Cs using a reference current Iref to carry out a scanning of a data voltage Vdata and a sampling operation of a threshold voltage during the programming period PP.

In one embodiment, the first scanning pulses EM1 to EMn is maintained at a high-level voltage to turn-off the first and sixth TFT M1 and M6, and the second scanning pulses SCAN1 to SCANn are maintained at a low-level voltage to turn-on the second, the fourth and the sixth TFT M2, M4 and MS during the programming period PP. A data voltage Vdata from the data line DL1 to DLm is charged, via the second TFT M2, into one electrode of the storage capacitor Cs connected to the a-node. A gate voltage lower than a source voltage of the third TFT M3 is charged into the other electrode of the storage capacitor Cs connected to the b-node. The difference voltage between the gate voltage and the source voltage of the third TFT M3 is equal or larger than the threshold voltage of the third TFT M3. At the same time, for example, the third TFT M3 is connected as a diode element because the fifth TFT M5 is turned-on. Accordingly, a reference current Iref flows into a high-level electric potential driving voltage VDD source, the third TFT M3, the fifth TFT M5, the fourth TFT M4 and the constant-current source Iref, sequentially, by the third TFT M3 operated by a diode during the programming period PP as shown in a solid line of FIG. 7. An a-node voltage Va between a drain electrode of the first TFT M1 and the storage capacitor Cs and a b-node voltage Vb between the storage capacitor Cs and a gate electrode of the third TFT M3 are defined by the following Equation 1 and Equation 2, respectively.

$$Va=Vdata \qquad \text{[Equation 1]}$$

$$Vb=VDD-|V_{T'}| \qquad \text{[Equation 2]}$$

herein, 'Vdata' represents a data voltage in Equation 1, and '$V_{T'}$' in Equation 2 is defined by the following Equation 3.

$$|V_{T'}| = |Vth| + \sqrt{\frac{2LIref}{k'W}} \qquad \text{[Equation 3]}$$

herein, 'Vth' represents a threshold voltage of the third TFT M3, 'k' represents a constant defined by mobility and a parasitic capacitance of the third TFT M3, 'L' represents a channel length of the third TFT M3 and 'W' represents a channel width of the third TFT M3, respectively.

A reference current Iref in Equation 3 is defined by Equation 4.

$$Iref = \frac{k'}{2}\frac{W}{L}(|V_{T'}| - |Vth|)^2 \qquad \text{[Equation 4]}$$

herein, a reference current Iref represents a current sensing a threshold voltage VTH of the third TFT M3 and a programming period sensing a threshold voltage VTH of the third TFT M3 is reduced as the current value is higher, but a power consumption can be increased that much. Accordingly, a reference current Iref is experimentally determined in consideration of a panel characteristics, a driving time and a power consumption. For example, a reference current Iref can be differentiated depending upon a semiconductor characteristics of the TFT provided with a panel, a driving frequency standard and a requirement of a power consumption, etc.

The first scanning pulses EM1 to EMn are inversed into a low-level voltage to turn-on the first and sixth TFT M1 and M6, and the second scanning pulses SCAN1 to SCANn are inversed into a high-level voltage to turn-off the second, the fourth and the fifth TFT M2, M4 and MS during the light-emitting period EP. Accordingly, a data voltage Vdata and a reference current Iref supplied to the pixel 54 are cut-off, and the reference voltage Vref is charged, via the first TFT M1, into one electrode of the storage capacitor Cs connected to the a-node. In this embodiment, the other electrode of the storage capacitor Cs connected to the b-node is bootstrapped by a reference voltage Vref to change a charge electric potential.

Accordingly, the third TFT M3 emits a light in accordance with a voltage of the changed b-node. The organic light-emitting diode element OLED is emitted by a reference current Iref flowing into a high-level electric potential driving voltage VDD source, the third TFT M3, the sixth TFT M6, the organic light-emitting diode element OLED and the ground voltage source GND, sequentially, during the light-emitting period EP as shown in a dotted line of FIG. 7. An a-node voltage Va and a b-node voltage Vb are defined by the following Equation 5 and Equation 6, respectively, and a current IOLED flowing into the organic light-emitting diode element OLED is defined by Equation 7 during the light-emitting period EP.

$$Va=Vref \quad \text{[Equation 5]}$$

$$Vb=VDD-|V_T|+Vref-Vdata \quad \text{[Equation 6]}$$

herein, a reference voltage Vref represents a voltage maintaining one voltage of the storage capacitor Cs during the light-emitting period EP and is defined by a arbitrary constant-voltage determined from a value of a data voltage and a reference current Iref.

$$\begin{aligned} I_{OLED} &= \frac{k'}{2}\frac{W}{L}(VDD-(VDD-|V_{T'}|+Vref-Vdata)-|Vth|)^2 \\ &= \frac{k'}{2}\frac{W}{L}\left(Vdata-Vref+\sqrt{\frac{2LIref}{k'W}}\right)^2 \end{aligned} \quad \text{[Equation 7]}$$

As shown in the above Equation 7, in the organic light-emitting diode display device. The equation defines a current IOLED that flows into the organic light-emitting diode element during the light-emitting period EP not includes an item of a high-level electric potential driving voltage VDD and a threshold voltage Vth of the third TFT M3. For example, a current IOLED flowing into the organic light-emitting diode element during the light-emitting period EP is never affected by a high-level electric potential driving voltage VDD and a threshold voltage Vth of the TFT.

FIG. 8 shows a second embodiment of the pixels 54 at the organic light-emitting diode display device.

In one embodiment, as shown in FIG. 8, each of the pixels 54 includes the first to sixth TFT M1 to M6, the storage capacitor Cs and the organic light-emitting diode element OLED. The TFTs M1 to M6 are implemented in a p-type MOS-FET. Since the first to fifth TFT M1 to M5, the storage capacitor Cs and the organic light-emitting diode element OLED are identical to those described in the embodiment of the above-mentioned FIG. 6, a detailed explanation as to it will be omitted.

The third TFT M3 is operated by a diode to flow a reference current Iref during the programming period PP like the above-mentioned embodiment.

The sixth TFT M6 is connected to a backward diode by the fifth TFT M5 turned-on during the programming period PP to cut-off a current IOLED supplied to the organic light-emitting diode element OLED while forms a current path between the c-node and the organic light-emitting diode element OLED during the light-emitting period EP to supply a current IOLED to the organic light-emitting diode element OLED. A gate electrode of the sixth TFT M6 is connected to the b-node. A source electrode of the sixth TFT M6 is connected to the c-node, and a drain electrode of the sixth TFT M6 is connected to an anode electrode of the organic light-emitting diode element OLED.

Figure 6:
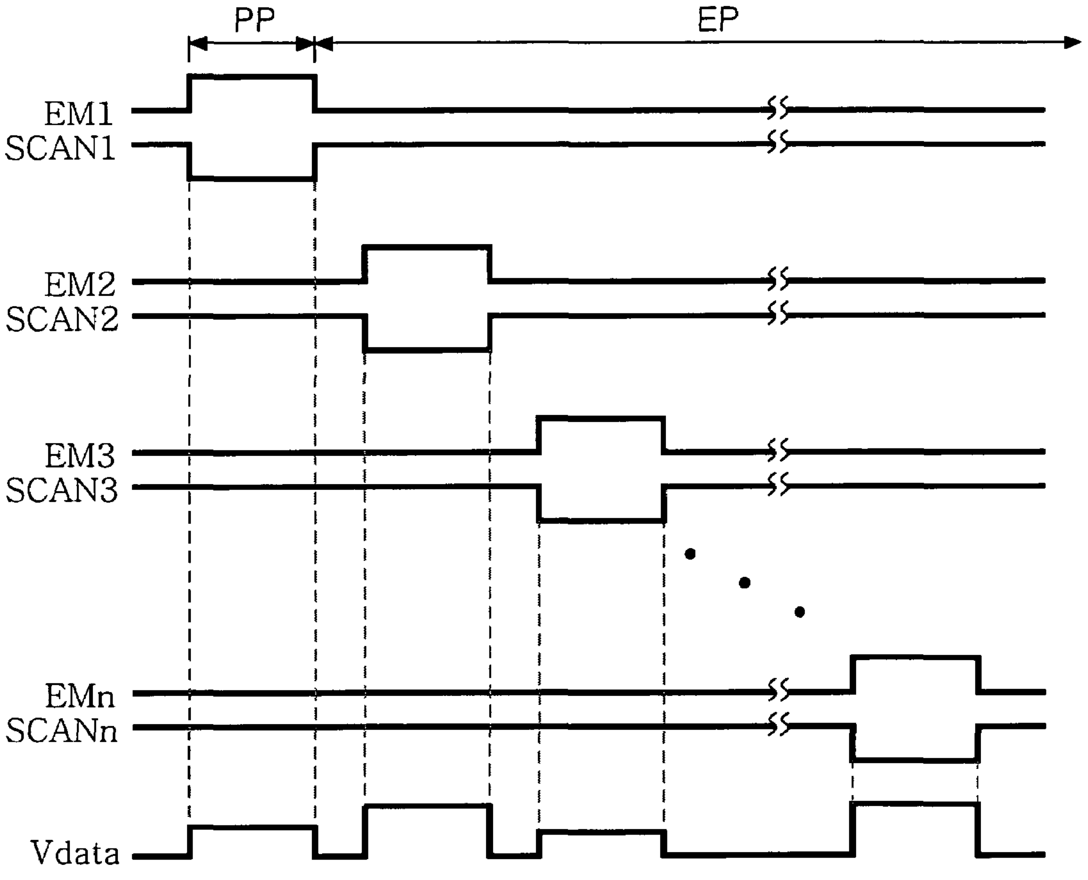
FIG. 6 is a waveform diagram showing an output waveform of the drivers shown in FIG. 5.

Such a pixel 54 shown in FIG. 8 is almost equally operated in comparison to the above-mentioned embodiment of FIG. 6.

The first TFT M1 is turned-off by the first scanning pulse EM1 to EMn while the second, the fourth and the fifth TFT M2, M4 and M5 are turned-on by the second scanning pulse SCAN1 to SCANn during the programming period PP. For example, at the same time, the third TFT M3 is operated as a forward diode by the turned-on fifth TFT M5 to flow a reference current Iref. The sixth TFT M6 is operated as a backward diode to cut-off a current supplied to the organic light-emitting diode element OLED. A data voltage Vdata is charged into the a-node and a threshold voltage of the third TFT M3 is sampled into the b-node during the programming period PP.

A voltage of the first scanning pulse EM1 to EMn is inversed to turn-off the second, the fourth and the fifth TFT M2, M4 and M5 and to turn-on the first TFT M1 during the light-emitting period EP. The third and sixth TFT M3 and M6 supplies a current IOLED not affected by a high-level electric potential driving voltage VDD and a threshold voltage Vth to the organic light-emitting diode element OLED during the light-emitting period EP.

FIG. 9 to FIG. 12 show an embodiment of an organic light-emitting diode display device that is adaptive for applying in a CMOS (Complementary Metal Oxide Semiconductor) process which forms a N-type MOS-FET and a P-type MOS-FET on the same substrate at the same time.

Referring to FIG. 9 to FIG. 12, the organic light-emitting diode display device according to the first embodiment includes a display panel 90 provided m×n pixels 94, a data driver 92 supplying a data voltage to data lines DL1 to DLm, a scan driver 93 sequentially supplying an scanning pulse of a low-level voltage to n scan electrode S1 to Sn and a timing controller 91 controlling the drivers 92 and 93.

In the display panel 90, pixels 94 is formed at pixel areas defined by an intersection of the scan lines S1 to Sn and the data lines DL1 to DLm. Signal lines supply a reference voltage Vref of a constant-voltage, a reference current Iref of a constant-current and a high-level electric potential driving voltage VDD to the pixels 94 are formed at the display panel 90. The scan lines E1 to En supplying scanning signals EM1 to EMn of a high-level voltage are removed at the display panel 90 in FIG. 9 in comparison to the display panel 50 in FIG. 5 to reduce the number of a signal line and to further simplify a panel structure. In the display panel in FIG. 5, the TFTs are comprised of only the P-type MOS-FETs at a pixel array area while in the display panel in FIG. 9, the TFTs are comprised of the P-type MOS-FETs and the N-type MOS-FETs at a pixel array area.

Figure 5:
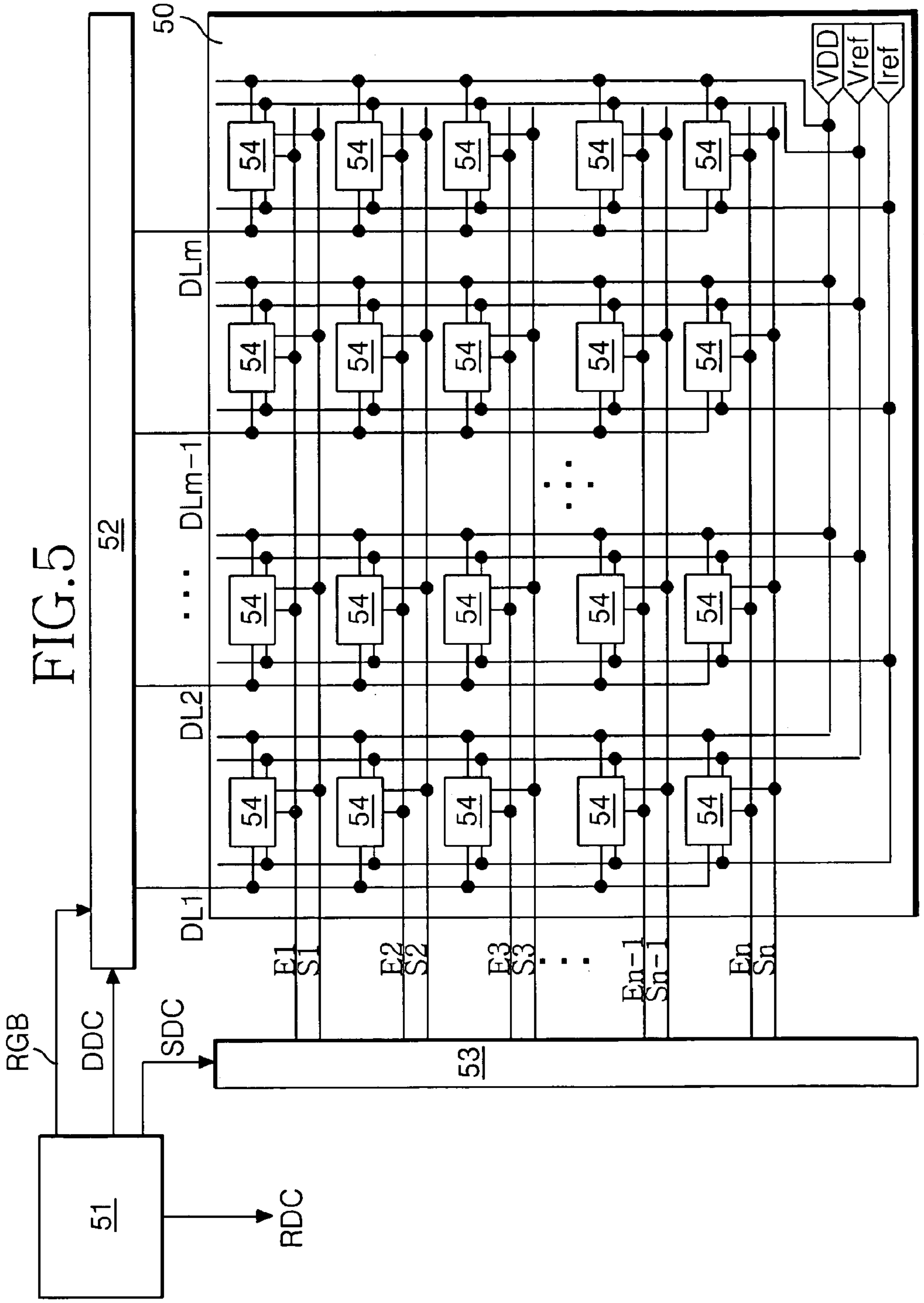
FIG. 5 is a block diagram showing an organic light-emitting diode display device according to a first embodiment.

The data driver 92 is essentially the same as the data driver 52 in FIG. 5.

Figure 10:
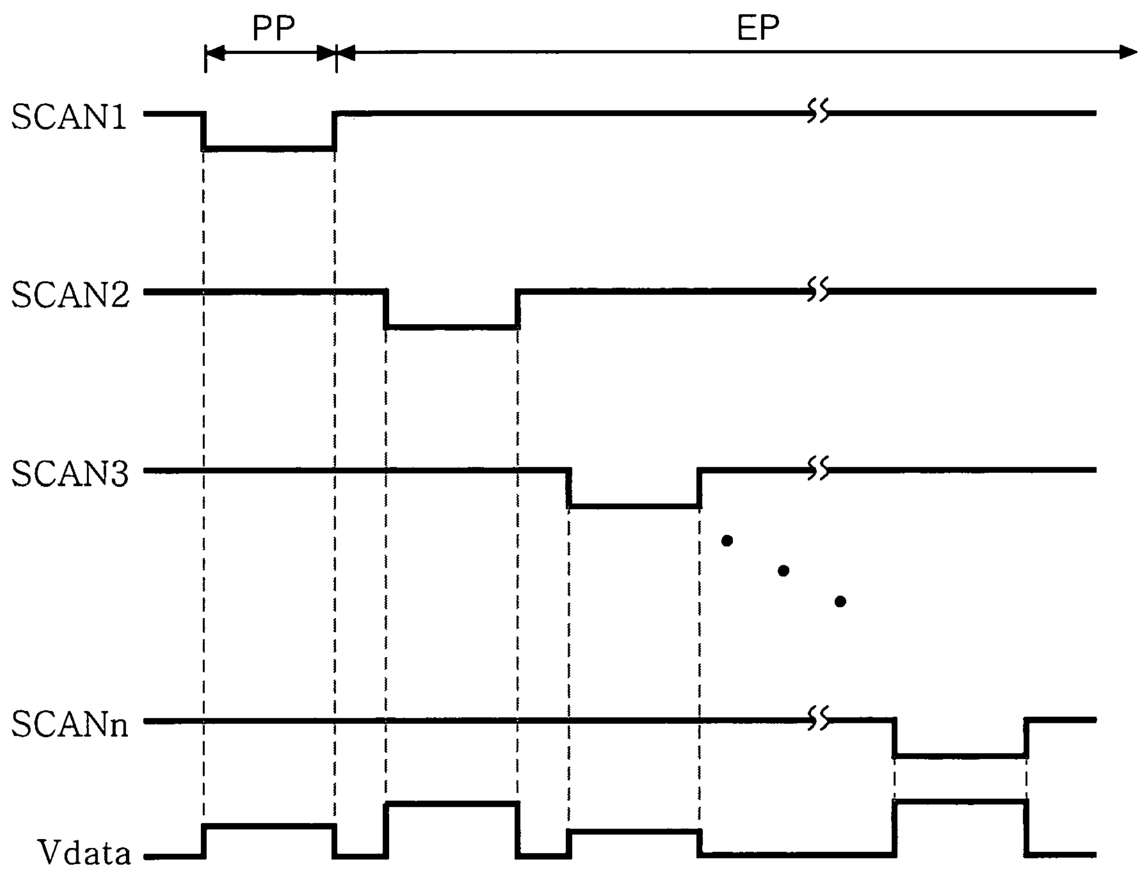
FIG. 10 is a waveform diagram showing an output waveform of drivers according to FIG. 9.

The scan driver 53 sequentially supplies scanning pulses SCAN1 to SCANn of a low-level voltage to the scan lines S1 to Sn in response to a control signal SDC from the timing controller 51 as shown in FIG. 10.

In one embodiment, the timing controller 91 supplies a digital video data RGB to the data driver 92 and generates a control signal DDC and GDC controlling an operation timing of the scan driver 93 and the data driver 92 using, for example, a vertical/horizontal synchronizing signal and a clock signal.

Alternatively, a constant-voltage source supplying the reference voltage Vref and a high-level electric potential driving voltage VDD and a positive voltage source supplying the reference current Iref are connected to the display panel 90.

Figure 11:
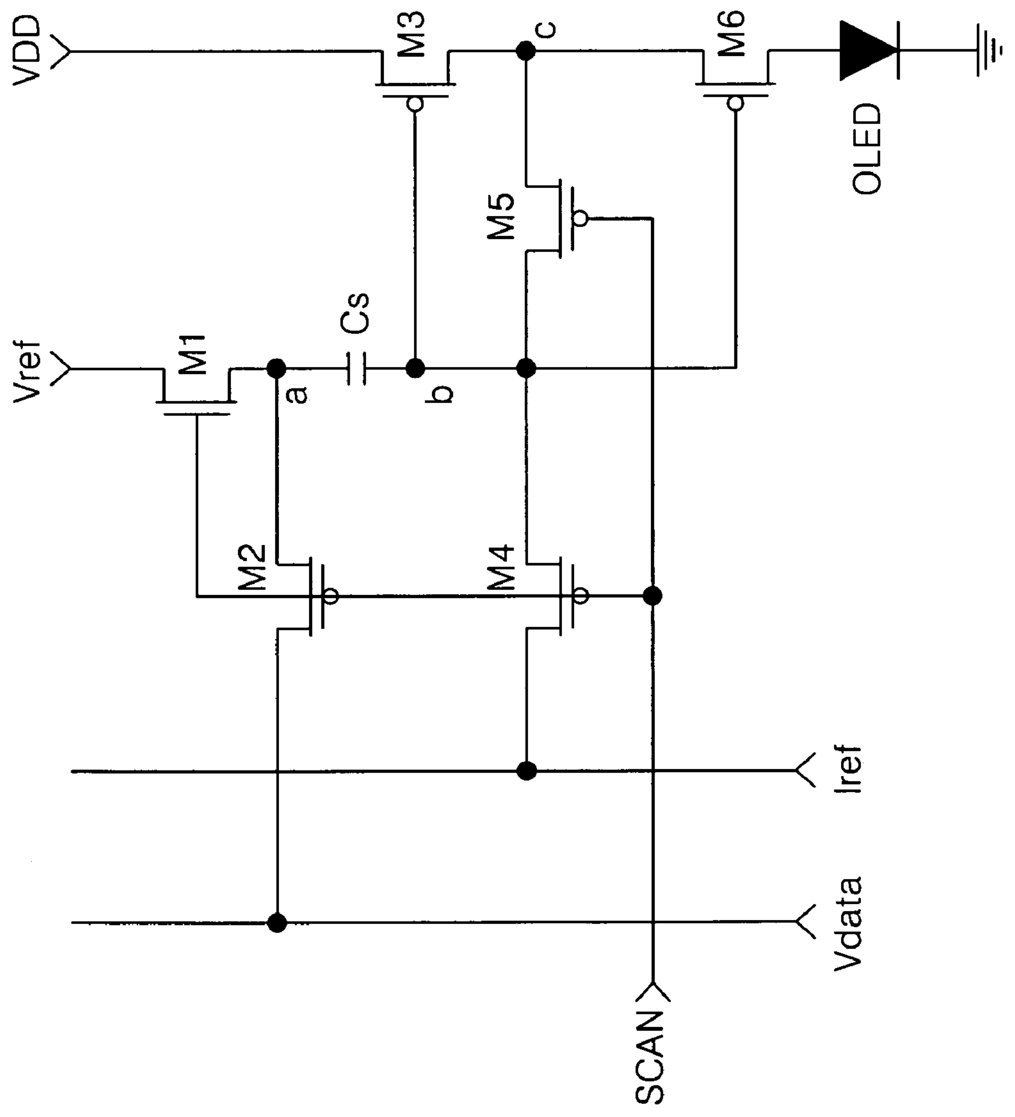
FIG. 11 is a circuit diagram showing a pixel according to FIG. 9.
Figure 12:
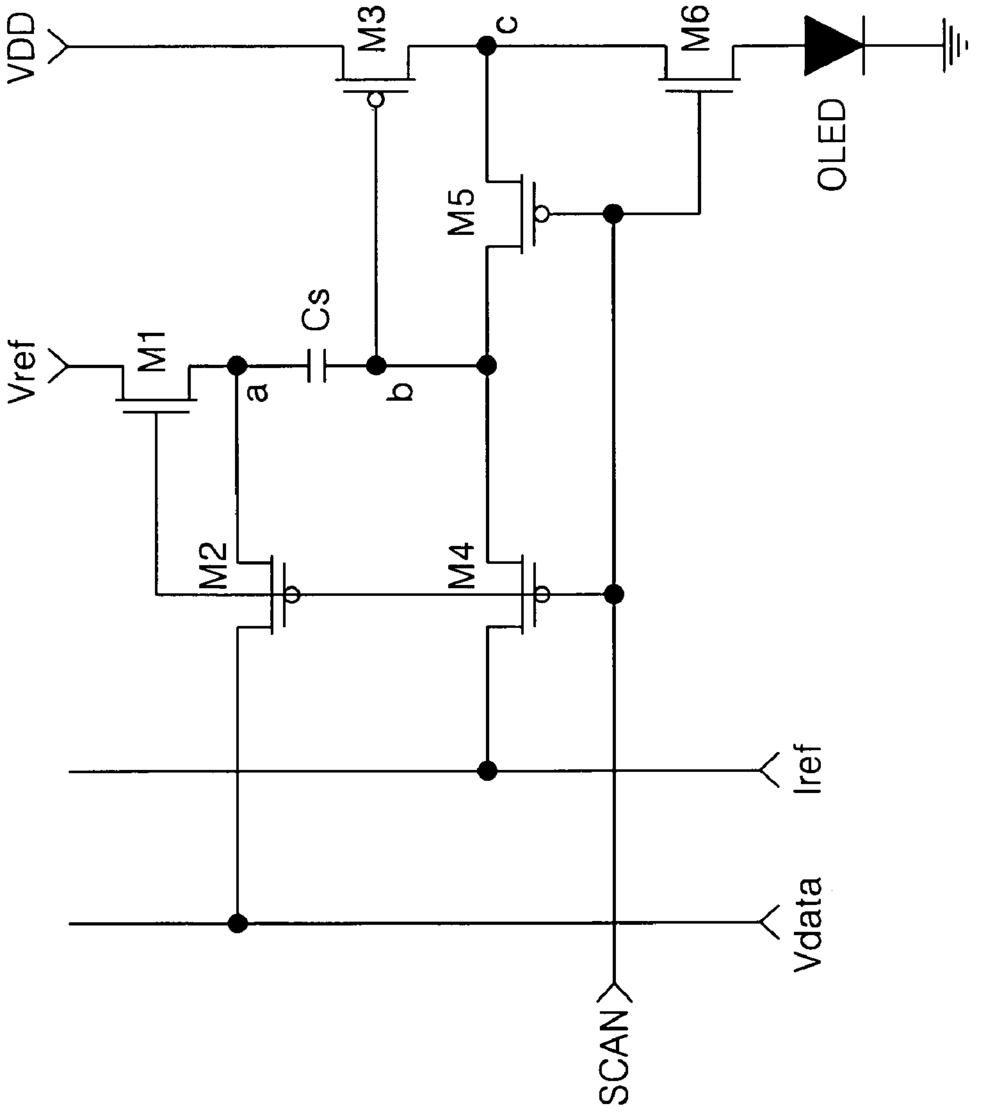
FIG. 12 is a circuit diagram showing a pixel according to FIG. 9.

In one embodiment, each of the pixels 94 includes six TFTs M1 to M6, the storage capacitor and the organic light-emitting diode element OLED shown in FIG. 11 and FIG. 12.

Figure 9:
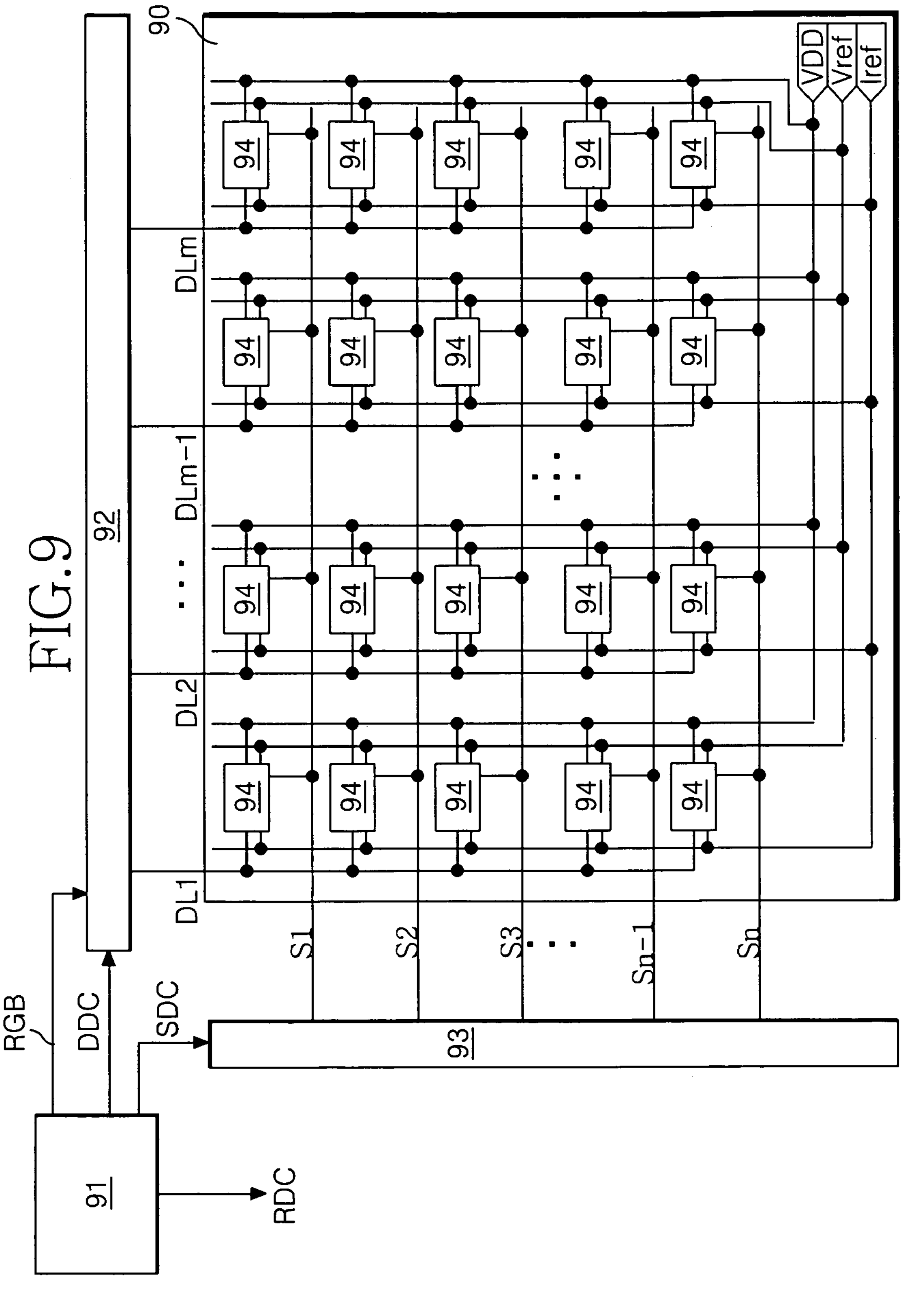
FIG. 9 is a block diagram showing an organic light-emitting diode display device.

FIG. 11 shows the first embodiment of the pixels 94 at the organic light-emitting diode display device shown in FIG. 9. Since the second to fifth TFT M2 to M5, the storage capacitor Cs and the organic light-emitting diode element OLED in FIG. 11 are identical to those described in the embodiment of the above-mentioned FIG. 7 and FIG. 8, a detailed explanation as to it will be omitted.

In one embodiment, as shown in FIG. 11, each of the pixels 94 includes the first TFT M1 comprised of the N-type MOS-FET, the second to sixth TFT M2 to M6 comprised of the P-type MOS-FET, the storage capacitor Cs and the organic light-emitting diode element OLED.

In one embodiment, the first TFT M1 is maintained at an off-state by the scanning pulses SCAN1 to SCANn supplied from the scan lines S1 to Sn to a low-level voltage during the programming period PP while turned-on by a high-level voltage supplied from the scan lines S1 to Sn to form a current path between the reference voltage source Vref and an a-node during the light-emitting period EP. Accordingly, the first TFT M1 is comprised of the N-type MOS-FET, a gate electrode of the first TFT M1 is connected to the scan lines S1 to Sn, and a drain electrode of the first TFT M1 is connected to the reference voltage source Vref. A source electrode of the first TFT M1 is connected to the a-node.

In one embodiment, the sixth TFT M6 is connected to an backward diode by the turned-on fifth TFT M5 to cut-off a current IOLED supplied to the organic light-emitting diode element OLED during the programming period PP while it forms a current path between the c-node and the organic light-emitting diode element OLED to supply a current IOLED to the organic light-emitting diode element OLED during the light-emitting period EP. A gate electrode of the sixth TFT M6 is connected to the b-node, and a source electrode of the sixth TFT M6 is connected to the c-node. A drain electrode of the sixth TFT M6 is connected to an anode electrode of the organic light-emitting diode element OLED.

In one embodiment, as shown in FIG. 11, a pixel 94 is almost equally operated in comparison to the above-mentioned embodiments.

If the scanning pulses SCAN1 to SCANn of a low-level voltage are generated, then the first TFT M1 is turned-off while the second, the fourth and the fifth TFT M2, M4 and M5 are turned-on during the programming period PP. At the same time, for example, the third TFT M3 is operated as a forward diode by the turned-on fifth TFT M5 to flow a reference current Iref and the sixth TFT M6 is operated as a backward diode to cut-off a current supplied to the organic light-emitting diode element OLED. A data voltage Vdata is charged into the a-node and a threshold voltage of the third TFT M3 is sampling into the b-node during the programming period PP.

A voltage of the scan lines S1 to Sn is risen to a high-level voltage to turn-off the second, the fourth and the fifth TFT M2, M4 and M5 and to turn-on the first TFT M1 during the light-emitting period EP. The third TFT M3 supplies a current IOLED which a gate voltage of the sixth TFT M6 is bootstrapped by the storage capacitor Cs to be not affected by a high-level electric potential driving voltage VDD and a threshold voltage Vth to the organic light-emitting diode element OLED during the light-emitting period EP.

In one embodiment, as shown in FIG. 12, each of the pixels 94 includes the first and sixth TFT M1 and M6 comprised of the N-type MOS-FET, the second to fifth TFT M2 to M5 comprised of the P-type MOS-FET, the storage capacitor Cs and the organic light-emitting diode element OLED.

The first TFT M1 is substantially the same as that shown in FIG. 11 with a view of a function and a connection relationship.

The sixth TFT M6 is turned-off by the scanning pulses SCAN1 to SCANn supplied from the scan lines S1 to Sn to a low-level voltage to cut-off a current IOLED supplied to the organic light-emitting diode element during the programming period PP while turned-on by a high-level voltage on the scan lines S to Sn to form a current path between the c-node and the organic light-emitting diode element, and to supply a current IOLED to the organic light-emitting diode element OLED during the light-emitting period EP. Accordingly, the sixth TFT M6 is comprised of the N-type MOS-FET, and a gate electrode of the sixth TFT M6 is connected to the b-node. A drain electrode of the sixth TFT M6 is connected to the c-node, and a source electrode of the sixth TFT M6 is connected to an anode electrode of the organic light-emitting diode element OLED.

Such a pixel 94 shown-in FIG. 12 is almost equally operated in comparison to the above-mentioned embodiments.

If the scanning pulses SCAN1 to SCANn of a low-level voltage are generated, then the first and sixth TFT M1 and M6 are turned-off while the second, the fourth and the fifth TFT M2, M4 and M5 are turned-on during the programming period PP. The third TFT M3 is operated as a forward diode by the turned-on fifth TFT M5 to flow a reference current Iref and the sixth TFT M6 cuts-off a current supplied to the organic light-emitting diode element OLED. A data voltage Vdata is charged into the a-node and a threshold voltage of the third TFT M3 is sampling into the b-node during the programming period PP. A voltage of the scan lines S1 to Sn is risen to a high-level voltage to turn-off the second, the fourth and the fifth TFT M2, M4 and M5 and to turn-on the first and sixth TFT M1 and M6 during the light-emitting period EP. A gate voltage of the third TFT M3 is bootstrapped by the storage capacitor Cs to be supplied a current IOLED not affected by a high-level electric potential driving voltage VDD and a threshold voltage Vth to the organic light-emitting diode element OLED during the light-emitting period EP.

The switch elements of FIG. 7 and FIG. 8 are comprised of the P-type MOS-FET, but the switches also can be comprised of the N-type MOS-FET. If the switch elements of FIG. 7 and FIG. 8 are comprised of the N-type MOS-FET, then a logic value or a polarity of a voltage of the scanning pulses shown in FIG. 6 are inversed. Likewise, a type of switch elements of FIG. 11 and FIG. 12 is changed and a logic value of a scanning pulse or a polarity can be changed.

An organic light-emitting diode display device and a driving method thereof minimizes a voltage drop by a driving voltage supply line and an adverse effect by a threshold voltage change of a thin film transistor using six switch elements and one storage capacitor to uniform display brightness.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. An organic light-emitting diode display device, comprising:

a driving voltage source;

a reference voltage source that generates a reference voltage;

a reference current source;

a storage capacitor connected between a first node and a second node;

an organic light-emitting diode device connected between a third node and a ground voltage source;

a first scanning signal that is supplied to a first scan line;

a second scanning signal that is supplied to a second scan line, the second scanning signal having an inverse-phase against the first scanning signal;

a data line that crosses the first and second scan lines, and to which a data voltage is supplied;

a first switch element that is operative to supply a reference voltage to the first node;

a second switch element that is operative to supply the data voltage to the first node;

a third switch element that is operative to adjust a current which is supplied to the organic light-emitting diode device in accordance with a voltage of the second node;

a fourth switch element that is operative to supply the reference current to the second node;

a fifth switch element that is operative to form a current path between the second node and the third node; and a sixth switch element that is operative to cut-off a current that flows into the organic light-emitting diode device via the third node and forms a current path between the third node and the organic light-emitting diode device.

2. The organic light-emitting diode display device as claimed in claim 1, wherein the first switch element maintains an off-state during a first period, and supplies the reference voltage to the first node in response to the first scanning signal, during a second period;

wherein the second switch element supplies the data voltage to the first node in response to the second scanning signal, during the first period, and maintains an off-state during the second period;

wherein the fourth switch element supplies the reference current to the second node in response to the second scanning signal, during the first period, and maintains an off-state, during the second period;

wherein the fifth switch element forms a current path between the second node and the third node in response to the second scanning signal, during the first period, and then maintains an off-state, during the second period;

wherein the sixth switch element cuts-off the current that flows into the organic light-emitting diode device via the third node, during the first period, and forms a current path between the third node and the organic light-emitting diode device in response to any one of the first scanning signals or a voltage of the second node.

3. The organic light-emitting diode display device according to claim 2, wherein the switch elements are the same type thin film transistors, each of the thin film transistors having a semiconductor layer primarily made from an amorphous silicon or a poly silicon.

4. The organic light-emitting diode display device according to claim 3, wherein the first switch element includes a gate electrode connected to the first scan line, a source electrode connected to the reference voltage source, and a drain electrode connected to the first node;

the second switch element includes a gate electrode connected to the second scan line, a source electrode connected to the data line, and a drain electrode connected to the first node;

the third switch element includes a gate electrode connected to the second node, a source electrode connected to the driving voltage source, and a drain electrode connected to the third node;

the fourth switch element includes a gate electrode connected to the second scan line, a source electrode connected to the second node, and a drain electrode connected to the reference current source;

the fifth switch element includes a gate electrode connected to the second scan line, a source electrode connected to the third node, and a drain electrode connected to the second node; and the sixth switch element includes a gate electrode connected to the first scan line, a source electrode connected to the third node, and a drain electrode connected to an anode electrode of the organic light-emitting diode element.

5. The organic light-emitting diode display device according to claim 3, wherein the first switch element includes a gate electrode connected to the first scan line, a source electrode connected to the reference voltage source, and a drain electrode connected to the first node;

the second switch element includes a gate electrode connected to the second scan line, a source electrode connected to the data line, and a drain electrode connected to the first node;

the third switch element includes a gate electrode connected to the second node, a source electrode connected to the driving voltage source, and a drain electrode connected to the third node;

the fourth switch element includes a gate electrode connected to the second scan line, a source electrode connected to the second node, and a drain electrode connected to the reference current source;

the fifth switch element includes a gate electrode connected to the second scan line, a source electrode connected to the third node, and a drain electrode connected to the second node; and the sixth switch element includes a gate electrode connected to the second node, a source electrode connected to the third node, and a drain electrode connected to an anode electrode of the organic light-emitting diode element.

6. An organic light-emitting diode display device, comprising:

a driving voltage source;

a reference voltage source that generates a reference voltage;

a reference current source;

a storage capacitor connected between a first node and a second node;

an organic light-emitting diode device connected between a third node and a ground voltage source;

a scan line to which a scanning signal is supplied;

a data line crossing the first and second scan lines, and to which a data voltage is supplied;

a first switch element that is operative to supply the reference voltage to the first node;

a second switch element that is operative to supply the data voltage to the first node;

a third switch element is operative to adjusts a current which is supplied to the organic light-emitting diode device in accordance with a voltage of the second node;

a fourth switch element is operative to supply the reference current to the second node;

a fifth switch element is operative to form a current path between the second node and the third node; and a sixth switch element is operative to cut-off a current that flows into the organic light-emitting diode device via the third node, and form a current path between the third node and the organic light-emitting diode device.

7. The organic light-emitting diode display device according to claim 6, wherein the first switch element maintains an off-state in response to a first voltage of the scanning signal, during a first period, and supplies the reference voltage to the first node in response to a second voltage of the scanning signal, during a second period;

wherein the second switch element supplies the data voltage to the first node in response to a first voltage of the scanning signal, during the first period, and then maintains an off-state, during the second period;

wherein the fourth switch element supplies the reference current to the second node in response to a first voltage of the scanning signal, during the first period, and then maintains an off-state, during the second period;

wherein the fifth switch element forms a current path between the second node and the third node in response to a first voltage of the scanning signal, during the first period, and then maintains an off-state, during the second period;

wherein the sixth switch element cuts-off a current that flows into the organic light-emitting diode device via the third node, during the first period, and forms a current path between the third node and the organic light-emitting diode device in response to any one of a voltage of the second node and a second voltage of the scanning signal, during the second period.

8. The organic light-emitting diode display device according to claim 7, wherein each of the switch elements having a semiconductor layer primarily made from an amorphous silicon or a poly silicon, and at least any one of the first switch element or the sixth switch element is a N-type MOS-FET, and the second and fifth switch element are P-type MOS-FETs.

9. The organic light-emitting diode display device according to claim 8, wherein the first switch element includes a gate electrode connected to the scan line, a drain electrode connected to the reference voltage source, and a source electrode connected to the first node;

the second switch element includes a gate electrode connected to the scan line, a source electrode connected to the data line, and a drain electrode connected to the first node;

the third switch element includes a gate electrode connected to the second node, a source electrode connected to the driving voltage source, and a drain electrode connected to the third node;

the fourth switch element includes a gate electrode connected to the scan line, a source electrode connected to the second node, and a drain electrode connected to the reference current source;

the fifth switch element includes a gate electrode connected to the scan line, a source electrode connected to the third node, and a drain electrode connected to the second node; and the sixth switch element includes a gate electrode connected to the second node, a source electrode connected to the third node, and a drain electrode connected to an anode electrode of the organic light-emitting diode element.

10. The organic light-emitting diode display device as claimed in claim 8, wherein the first switch element includes a gate electrode connected to the scan line, a drain electrode connected to the reference voltage source, and a source electrode connected to the first node;

the second switch element includes a gate electrode connected to the scan line, a source electrode connected to the data line, and a drain electrode connected to the first node;

the third switch element includes a gate electrode connected to the second node, a source electrode connected to the driving voltage source, and a drain electrode connected to the third node;

the fourth switch element includes a gate electrode connected to the scan line, a source electrode connected to the second node, and a drain electrode connected to the reference current source;

the fifth switch element includes a gate electrode connected to the scan line, a source electrode connected to the third node, and a drain electrode connected to the second node; and the sixth switch element includes a gate electrode connected to the scan line, a drain electrode connected to the third node, and a source electrode connected to an anode electrode of the organic light-emitting diode element.

11. A method of driving an organic light-emitting diode display device, the display device including a plurality of data lines and data lines that cross with each other, a storage capacitor connected between a first node and a second node and an organic light-emitting diode element connected to a third node and a ground voltage source, the method comprising:

generating a driving voltage, a reference voltage, and a reference current;

supplying a first scanning signal to a first scan line and, supplying a second scanning signal having an inverse-phase against the first scanning signal to a second scan line;

supplying a data voltages to the data lines;

turning-off a first switch element to which the reference voltage is supplied and connected to the first node and a sixth switch element connected between the third node and the organic light-emitting diode element, during a first period when the first scanning signal maintains a first logic voltage and the second scanning signal maintains a second logic voltage;

turning-on a second switch element to which the data voltage is supplied and connected to the first node, a fourth switch element to which the reference current is supplied and connected to the second node, and a fifth switch element connected between the second node and the third node, respectively, to charge the data voltage into the first node, connecting the second node to the third node to supply the driving voltage, during the first period; and operating a third switch connected to the third node as a diode to drive the organic light-emitting diode element into a diode, during the first period.

12. The method of driving an organic light-emitting diode display device according to claim 11, wherein during a second period when the first scanning signal maintains a second logic voltage and the second scanning signal maintains a first logic voltage, turning-off the first and sixth switch elements, turning-on the second, the fourth and the fifth switch elements to cut-off the data voltage to be supplied to the first node and the reference current supplied to the second node, and charging the first node and the second node using the reference voltage to allow a current to be flowed into the organic light-emitting diode element via the third and sixth switch elements.

13. The method of driving the organic light-emitting diode display device as claimed in claim 12, wherein a voltage Va of the first node is defined, during the first period, and a voltage Vb of the second node is defined, during the first period, by:

Va=Vdata wherein Vdata represents the data voltage, $Vb=VDD-|V_T|$ wherein VDD represents the driving voltage, and $V_T$ is defined as:

$$|V_{T'}| = |Vth| + \sqrt{\frac{2LIref}{k'W}}$$

wherein Vth represents a threshold voltage of the third switch element, k' represents a constant defined by mobility and a parasitic capacitance of the third switch element, L represents a channel length of the third switch element, and W represents a channel width of the third switch element.

14. The method of driving the organic light-emitting diode display device according to claim 13, wherein the reference current Iref is defined by the following equation during the first period:

$$Iref = \frac{k'}{2}\frac{W}{L}(|V_{T'}| - |Vth|)^2.$$

15. The method of driving the organic light-emitting diode display device as claimed in claim 14, wherein the reference current flows along a current path which connects the third switch element, the fifth switch element and the fourth switch element.

16. The method of driving the organic light-emitting diode display device according to claim 11, wherein a voltage Va of the first node and a voltage Vb of the second node are defined by the following equation during the second period:

Va=Vref $Vb=VDD-|V_T|+Vref-Vdata$ wherein VDD represents the driving voltage and $V_T$ is defined as:

$$|V_{T'}| = |Vth| + \sqrt{\frac{2LIref}{k'W}}$$

wherein Vth represents a threshold voltage of the third switch element, k represents a constant defined by mobility and a parasitic capacitance of the third switch element, L represents a channel length of the third switch element, and W represents a channel width of the third switch element.

17. The method of driving the organic light-emitting diode display device according to claim 16, wherein a current $I_{OLED}$ flowing into the organic light-emitting diode element is defined by the following Equation during the second period:

$$\begin{aligned} I_{OLED} &= \frac{k'}{2}\frac{W}{L}(VDD - (VDD - |V_{T'}| + Vref - Vdata) - |Vth|)^2 \\ &= \frac{k'}{2}\frac{W}{L}\left(Vdata - Vref + \sqrt{\frac{2LIref}{k'W}}\right)^2 \end{aligned}$$

wherein Vdata represents the data voltage, and Vref represents the reference voltage.

18. The method of driving the organic light-emitting diode display device according to claim 17, wherein a current that flows into the organic light-emitting diode element corresponding to the data voltage flows along a current path which connects the third switch element, the sixth switch element, the organic light-emitting diode element, and the ground voltage source, during the second period.

19. A method of driving an organic light-emitting diode display device, the display device including a plurality of data lines and data lines that cross with each other, a storage capacitor connected between a first node and a second node and an organic light-emitting diode element connected to a third node and a ground voltage source, the method comprising:

generating a driving voltage, a reference voltage, and a reference current;

sequentially supplying scanning signals to the scan lines;

supplying a data voltages to the data lines;

turning-off a first switch element to which the reference voltage is supplied, and connected to the first node, during a first period when the scanning signal maintains an active logic voltage;

turning-on a second switch element to which the data voltage is supplied and connected to the first node, a fourth switch element to which the reference current is supplied and connected to the second node, and a fifth switch element connected between the second node and the third node, to connect the second node to third node thereby charging the data voltage into the first node, and to connect the second node to the third node which supplies the driving voltage, during the first period;

operating a third switch element connected to the third node as a forward-vias diode to drive the organic light-emitting diode element 1, during the first period; and operating a sixth switch element connected between the third node and the organic light-emitting diode element as a reverse-vias diode, during the first period.

20. A method of driving an organic light-emitting diode display device according to claim 19, wherein during a second period when the scanning signal maintains an inactive logic voltage, turning-on the first switch element;

turning-off the second, the fourth and the fifth switch elements to cut off the data voltage supplied to the first node;

cutting-off the reference current supplied to the second node; and charging the first node and the second node using the reference voltage to flow into the organic light-emitting diode element via the third and sixth switch element.

21. The method of driving the organic light-emitting diode display device according to claim 20, wherein a voltage Va of the first node and a voltage Vb of the second node are defined by the following equations during the first period:

Va=Vdata $Vb=VDD-|V_T|$ wherein VDD represents the driving voltage, Vdata represents the data voltage, and $V_{T'}$ is defined by the following:

$$|V_{T'}| = |Vth| + \sqrt{\frac{2LIref}{k'W}}$$

wherein Vth represents a threshold voltage of the third switch element, k represents a constant defined by mobility and a parasitic capacitance of the third switch element, 'L' represents a channel length of the third switch element, and W represents a channel width of the third switch element.

22. The method of driving the organic light-emitting diode display device according to claim 21, wherein the reference current Iref is defined by the following equation, during the first period:

$$Iref = \frac{k'}{2}\frac{W}{L}(|V_{T'}| - |Vth|)^2.$$

23. The method of driving the organic light-emitting diode display device according to claim 22, wherein the reference current flows along a current path which connects the third switch element, the fifth switch element, and the fourth switch element.

24. The method of driving the organic light-emitting diode display device according to claim 23, wherein a voltage Va of the first node and a voltage Vb of the second node are defined by the following equation, during the second period:

$$Va=Vref$$

$$Vb=VDD-|V_{T'}|+Vref-Vdata$$

wherein VDD represents the driving voltage, and $V_{T'}$ is defined by the following equation:

$$|V_{T'}| = |Vth| + \sqrt{\frac{2LIref}{k'W}}$$

wherein Vth represents a threshold voltage of the third switch element, k represents a constant defined by mobility and a parasitic capacitance of the third switch element, L represents a channel length of the third switch element, and W represents a channel width of the third switch element.

25. The method of driving the organic light-emitting diode display device according to claim 24, wherein a current $I_{OLED}$ flowing into the organic light-emitting diode element is defined by the following equation during the second period:

$$\begin{aligned} I_{OLED} &= \frac{k'}{2}\frac{W}{L}(VDD - (VDD - |V_{T'}| + Vref - Vdata) - |Vth|)^2 \\ &= \frac{k'}{2}\frac{W}{L}\left(Vdata - Vref + \sqrt{\frac{2LIref}{k'W}}\right)^2 \end{aligned}$$

wherein Vdata represents the data voltage, and Vref represents the reference voltage.

26. The method of driving the organic light-emitting diode display device according to claim 24, wherein a current flowing into the organic light-emitting diode element corresponding to the data voltage flows along a current path which connects the third switch element, the sixth switch element, the organic light-emitting diode element, and the ground voltage source, during the second period.

* * * * *